US012602587B2

(12) United States Patent
Pan et al.

(10) Patent No.: US 12,602,587 B2
(45) Date of Patent: Apr. 14, 2026

(54) MULTI-TASK DEEP LEARNING NETWORK AND GENERATION METHOD THEREOF

(71) Applicant: ALi Corporation, Hsinchu (TW)

(72) Inventors: Jou-Yun Pan, Taipei (TW); Keng-Chih Chen, Taipei (TW)

(73) Assignee: ALi Corporation, Hsinchu (TW)

( * ) Notice: Subject to any disclaimer, the term of this patent is extended or adjusted under 35 U.S.C. 154(b) by 787 days.

(21) Appl. No.: 17/955,567

(22) Filed: Sep. 29, 2022

(65) Prior Publication Data

US 2023/0116880 A1 Apr. 13, 2023

(30) Foreign Application Priority Data

Oct. 8, 2021 (CN) .......................... 202111170730.2

(51) Int. Cl.
*G06N 3/082* (2023.01)
(52) U.S. Cl.
CPC .................................... *G06N 3/082* (2013.01)
(58) Field of Classification Search
None
See application file for complete search history.

(56) References Cited

U.S. PATENT DOCUMENTS

2021/0133547 A1* 5/2021 Lin ........................ G06N 3/067

FOREIGN PATENT DOCUMENTS

| CN | 107977671 | 5/2018 |
| CN | 109298940 A | 2/2019 |
| CN | 109543829 | 3/2019 |
| CN | 109727428 | 5/2019 |
| CN | 111160268 | 5/2020 |
| CN | 112256765 A | 1/2021 |
| IN | 201641031908 A | 3/2018 |

OTHER PUBLICATIONS

Jiang, Wei, et al. "Optimized co-scheduling of mixed-precision neural network accelerator for real-time multitasking applications." Journal of Systems Architecture 110 (2020): 101775. (Year: 2020).*
Georgiev, Petko, et al. "Low-resource multi-task audio sensing for mobile and embedded devices via shared deep neural network representations." Proceedings of the ACM on Interactive, Mobile, Wearable and Ubiquitous Technologies 1.3 (2017): 1-19. (Year: 2017).*
"Office Action of China counterpart Application", issued on Aug. 11, 2025, p. 1-p. 12.

* cited by examiner

*Primary Examiner* — Eric Nilsson
(74) *Attorney, Agent, or Firm* — JCIPRNET

(57) ABSTRACT

A multi-task deep learning network and a generation method thereof are provided. The generation method of a multi-task deep learning network includes: building at least one shared layer, where the shared layer is configured to receive a plurality of pieces of input information and generate a plurality of pieces of processed feature information; building a plurality of groups of task-specific layers, wherein the groups of task-specific layers compute and generate a plurality of groups of output information corresponding to a plurality of different tasks according to the pieces of processed feature information; and activating at least one of the groups of task-specific layers in stages according to a power supply state of an electronic apparatus.

9 Claims, 7 Drawing Sheets

200

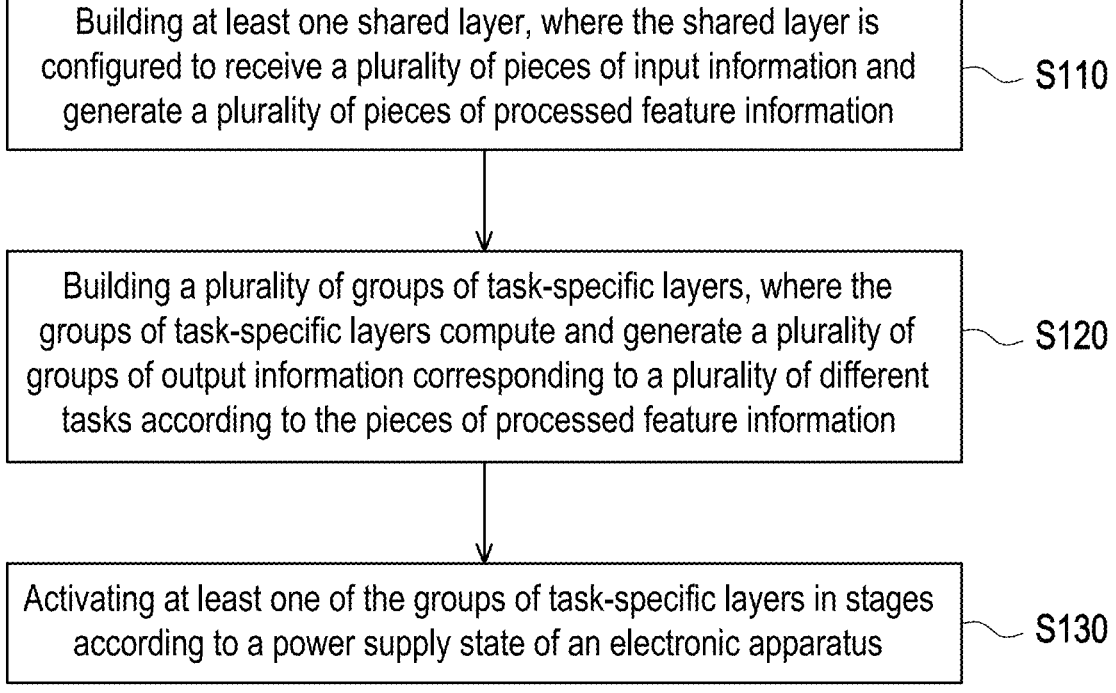

Building at least one shared layer, where the shared layer is configured to receive a plurality of pieces of input information and generate a plurality of pieces of processed feature information — S110

Building a plurality of groups of task-specific layers, where the groups of task-specific layers compute and generate a plurality of groups of output information corresponding to a plurality of different tasks according to the pieces of processed feature information — S120

Activating at least one of the groups of task-specific layers in stages according to a power supply state of an electronic apparatus — S130

FIG. 1

MULTI-TASK DEEP LEARNING NETWORK AND GENERATION METHOD THEREOF

CROSS-REFERENCE TO RELATED APPLICATION

This application claims the priority benefit of China application serial no. 202111170730.2, filed on Oct. 8, 2021. The entirety of the above-mentioned patent application is hereby incorporated by reference herein and made a part of this specification.

BACKGROUND

Technical Field

The disclosure relates to a multi-task deep learning network and a generation method thereof, and in particular, relates to a multi-task deep learning network and a generation method thereof capable of operating according to the power supply state.

Description of Related Art

In the commonly-known technical field, in a multi-task deep learning network, multiple independent networks are used most of the time to perform different tasks. Under such condition, an electronic apparatus executing the multi-task deep learning network need to use complex circuits to perform task-related operations, and power waste may thus occur. In addition, in the case of low power supply, the multi-task deep learning network may also fail to operate due to insufficient power supply, causing the electronic apparatus to fail to work as a result.

SUMMARY

The disclosure provides a multi-task deep learning network and a generation method thereof capable of determining the task-specific layer to be activated according to a power supply state.

According to an embodiment of the disclosure, the disclosure provides a generation method of a multi-task deep learning network, and the generation method includes the following steps. At least one shared layer is built, and the shared layer is configured to receive a plurality of pieces of input information and generate a plurality of pieces of processed feature information. A plurality of groups of task-specific layers are built, and the groups of task-specific layers compute and generate a plurality of groups of output information corresponding to a plurality of different tasks according to the pieces of processed feature information. At least one of the groups of task-specific layers is activated in stages according to a power supply state of an electronic apparatus.

An embodiment of the disclosure further provides a multi-task deep learning network suitable for an electronic apparatus. The multi-task deep learning network includes at least one shared layer and a plurality of groups of task-specific layers. The shared layer is configured to receive a plurality of pieces of input information and generate a plurality of pieces of processed feature information. The groups of task-specific layers compute and generate a plurality of groups of output information corresponding to a plurality of different tasks according to the processed feature information. Each one of the groups of task-specific layers is activated in stages according to a power supply state of the electronic apparatus.

To sum up, in the multi-task deep learning network provided by the embodiments of the disclosure, at least one of the groups of task-specific layers may be activated in stages according to the power supply state of the electronic apparatus. In this way, the electronic apparatus may activate the task-specific layer that needs to be executed according to the actual power state, and the working efficiency of the electronic apparatus may thus be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1 is a flow chart of a generation method of a multi-task deep learning network according to an embodiment of the disclosure.

DESCRIPTION OF THE EMBODIMENTS

Figure 2:
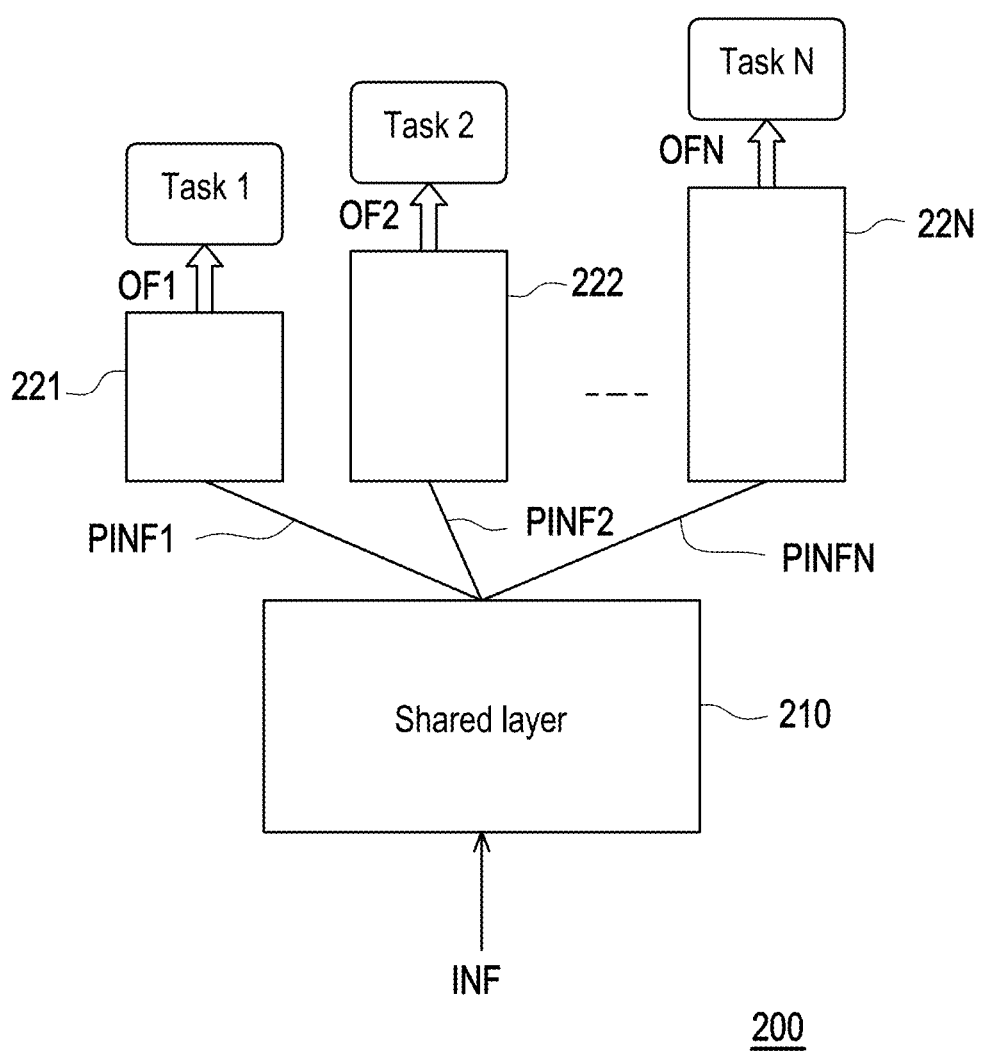
FIG. 2 is a schematic diagram of the multi-task deep learning network according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

With reference to FIG. 1 and FIG. 2 together, FIG. 1 is a flow chart of a generation method of a multi-task deep learning network according to an embodiment of the disclosure, and FIG. 2 is a schematic diagram of the multi-task deep learning network according to an embodiment of the disclosure. A multi-task deep learning network 200 provided by this embodiment is suitable for being applied in an electronic apparatus. In step S110, at least one shared layer 210 is built. The shared layer 210 is configured to receive a plurality of pieces of input information INF and generate a plurality of pieces of processed feature information PINF1 to PINFN. In this embodiment, one or more shared layers 210 may be provided. The shared layer 210 may be a network layer in a deep learning network that is used to perform pre-processing for processing the input information INF. In this embodiment, the deep learning network may be an artificial neural network (ANN), and the shared layer 210 may be a weighted shared layer, which uses the same weight to compute the input information INF (for example, to perform a convolution operation with the same convolution kernel) to extract features therein, and the amount of parameter computation may be lowered in this way.

In step S120, a plurality of groups of task-specific layers 221 to 22N are built. The groups of task-specific layers are configured to compute and generate a plurality of groups of output information OF1 to OFN corresponding to a plurality of different tasks (task 1 to task N) according to the pieces of processed feature information PINF1 to PINFN generated by the shared layer 210. Further, in step S130, at least one of the groups of task-specific layers 221 to 22N are activated according to a power supply state of the electronic apparatus. Each of the groups of task-specific layers 221 to 22N may have one or more neural network layers. The groups of task-specific layers 221 to 22N respectively are configured to perform multiplication and addition operations on the processed feature information PINF1 to PINFN, so as to generate the groups of output information OF1 to OFN, respectively.

In detail, each of the groups of task-specific layers 221 to 22N may determine whether to be turned on according to the power supply state of the electronic apparatus at present. Herein, each of the groups of task-specific layers 221 to 22N may have a plurality of requirement conditions corresponding to a plurality of priorities. Each of the requirement conditions includes at least one of a power consumption requirement, a computing power requirement, and a hardware requirement. For instance, the task-specific layer 221 has a minimum power consumption requirement and corresponds to a highest priority. The task-specific layer 222 has a second minimum power consumption requirement and corresponds to a second highest priority. The task-specific layer 22N has a maximum power consumption requirement and corresponds to a lowest priority. When the power supply state of the electronic apparatus at present is a low power state and is only sufficient to enable the task-specific layer 221 to operate normally, the electronic apparatus may only enable the task-specific layer 221 to be turned on and execute task 1 with the highest priority. If the power supply state of the electronic apparatus at present is upgraded to enable multiple or all of the groups of task-specific layers 221 to 22N to operate, the electronic apparatus may enable multiple or all of the groups of task-specific layers 221 to 22N to execute operations in stages according to the set priority.

Similarly, the task-specific layer 221 may also have at least one of a minimum computing power requirement and a minimum hardware requirement and corresponds to a first highest priority. The hardware requirement herein may be, for example, a size of a memory, and the computing power requirement may be an operating frequency of a processor executing the task-specific layer 221. The task-specific layer 222 may have at least one of a second minimum computing power requirement and a second minimum hardware requirement and corresponds to the second highest priority. The task-specific layer 22N may have at least one of a maximum computing power requirement and a maximum hardware requirement and corresponds to the lowest priority.

The abovementioned steps may be completed by a processor with computing power. Herein, the establishment details of the shared layer and the task-specific layers may be implemented by applying any artificial neural network establishment method known to a person having ordinary skill in the art and are not particularly limited.

Figure 3:
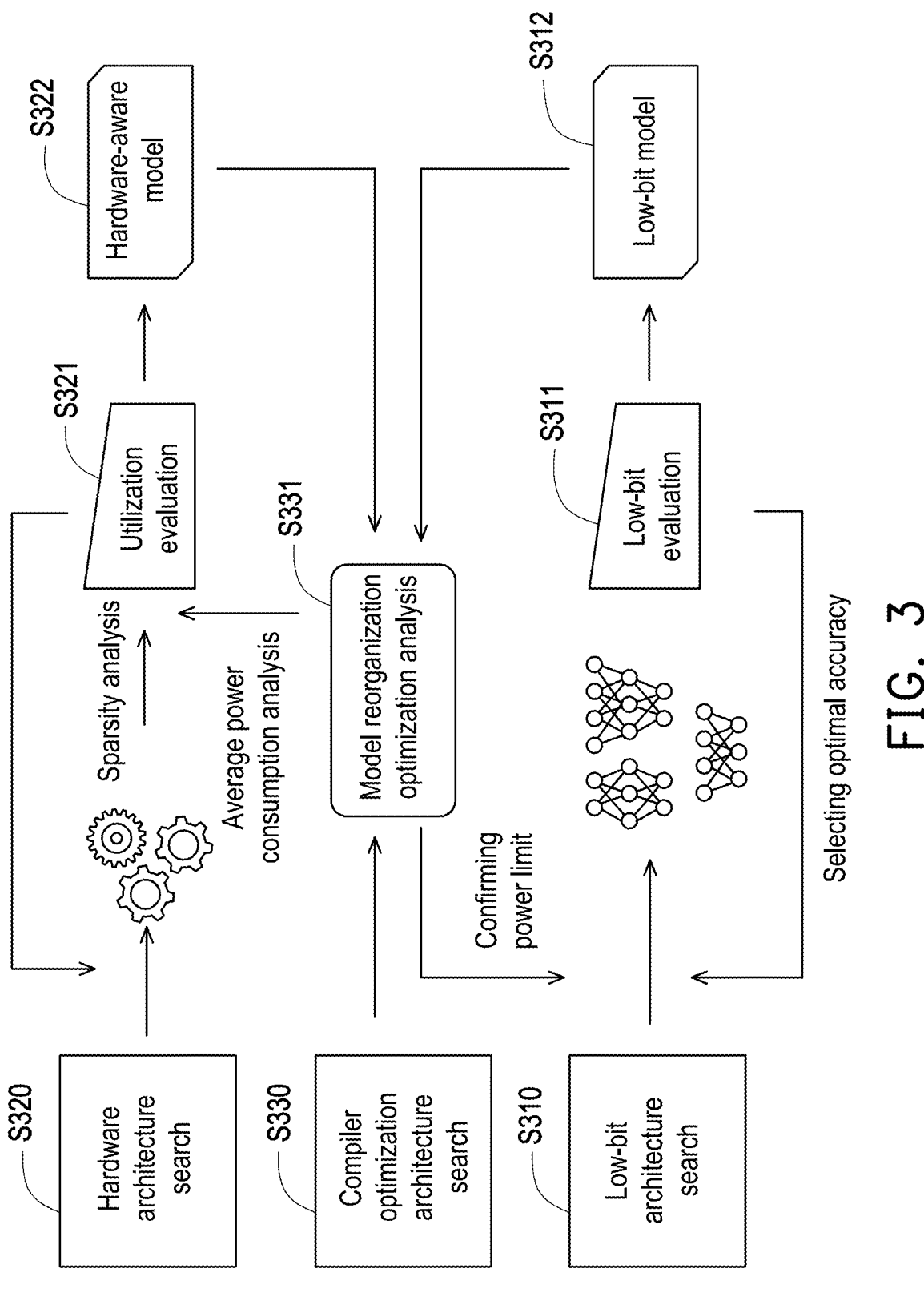
FIG. 3 is a flow chart of an example of a generation method of a multi-task deep learning network according to an embodiment of the disclosure.

With reference to FIG. 3, FIG. 3 is a flow chart of an example of a generation method of a multi-task deep learning network according to an embodiment of the disclosure. The process of this method may be completed by a processor with computing power. Regarding establishment details of the groups of task-specific layers, in this embodiment, power consumption information corresponding to arithmetic units used to perform the multiplication and addition operations in the task-specific layers may be established first. Generally, in the operation of artificial neural networks, multipliers, adders, memory, and other related hardware are required to be applied most of the time. In multipliers and adders, according to the number of bits that can be processed, each has different power consumption, and the adders with floating-point computing power may further exhibit different power consumption. Besides, different types of memory access actions also require different power consumption. The power consumption information of this embodiment is shown in Table 1 as follows.

TABLE 1

| Arithmetic unit | Power consumption (picojoule) |
| --- | --- |
| 8-bit adder | 0.03 |
| 16-bit adder | 0.05 |
| 32-bit adder | 0.1 |
| 16-bit floating point adder | 0.4 |
| 32-bit floating point adder | 0.9 |
| 8-bit multiplier | 0.2 |
| 32-bit multiplier | 3.1 |
| 16-bit floating point multiplier | 1.1 |
| 32-bit floating point multiplier | 3.7 |
| 32-bit static memory | 5 |
| 32-bit dynamic memory | 640 |

Next, step S310 may be performed to perform a low-bit architecture search. Herein, in step S310, for each one among the groups of task-specific layers, according to a predetermined accuracy requirement and the power consumption information in Table 1, through a low-bit evaluation action (step 311), plural ones among the arithmetic units are selected to build a selected model based on minimum total power consumption, and the selected model herein is a low-bit model (step S312). In step S310 to step S312, only the numbers of bits of the arithmetic units are evaluated, and a low-bit model with a lowest number of bits is found under the requirement of optimal accuracy.

In addition, in this embodiment, the processor performs a hardware architecture search (step S320). The processor may perform a network weight sparsity analysis and a utilization evaluation to optimize network pruning (step S321) to generate a hardware-aware model (step S322). Herein, in the step of utilization evaluation, optimal power consumption may be selected as the basis for sparsity analysis.

Further, the processor may perform a compiler optimization architecture search (step S330), performs an optimization analysis on the hardware-aware model and the low-bit model through a model reorganization optimization analysis (step S331), and then confirms power limit and generates an average power consumption analysis. The confirmed power limit may be provided as a basis for the low-bit evaluation, and information from the average power consumption analysis may be provided as a basis for the utilization evaluation.

The processor may generate each one of the groups of task-specific layers according to the hardware-aware model.

Figure 4A:
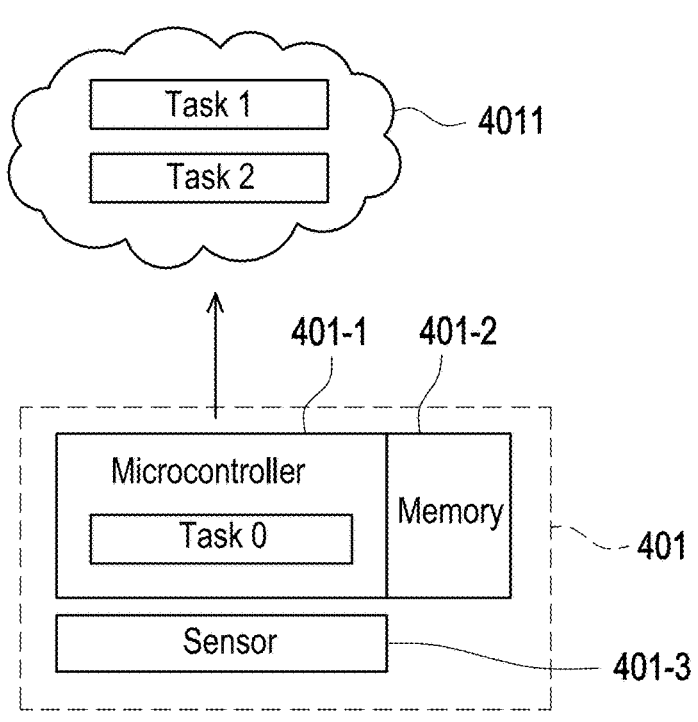
FIG. 4A to FIG. 4C are schematic diagrams of applications of the multi-task deep learning network according to an embodiment of the disclosure.
Figure 4B:
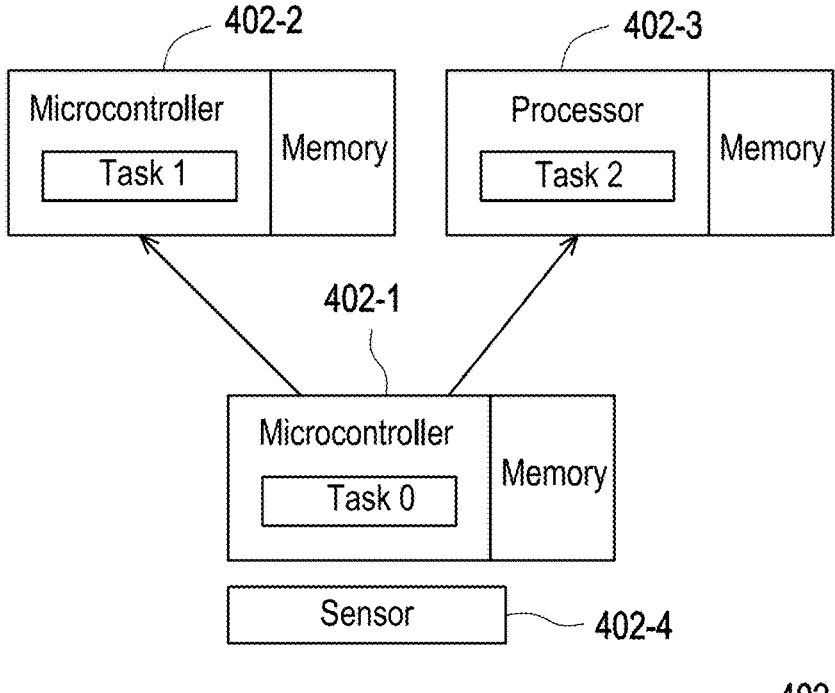
Figure 4C:
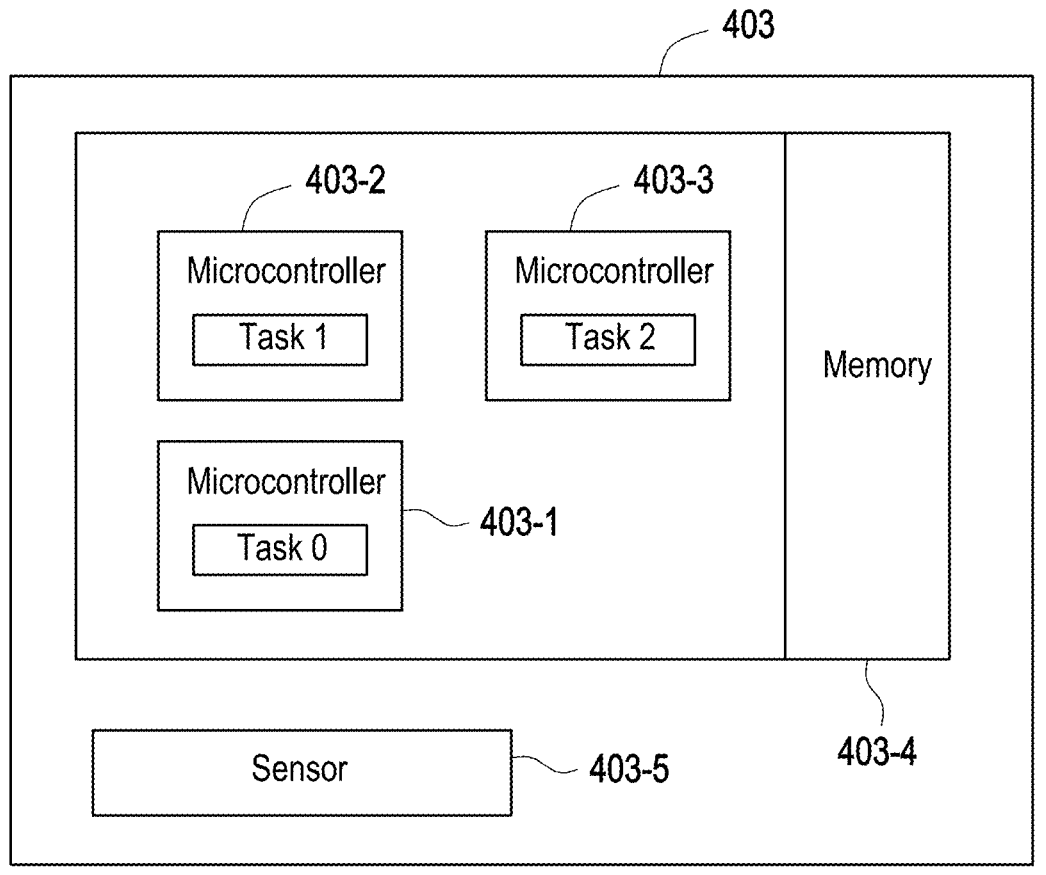

With reference to FIG. 4A to FIG. 4C, FIG. 4A to FIG. 4C are schematic diagrams of applications of the multi-task deep learning network according to an embodiment of the disclosure. In FIG. 4A, in the multi-task deep learning network, a local electronic apparatus 401 includes a microcontroller 401-1, a memory 401-2, and a sensor 401-3. The microcontroller 401-1 may be configured to compute the shared layer as well as the task-specific layer for executing task 0. The sensor 401-3 may act as a medium for receiving input information, for example, for receiving image signals, audio signals, or other types of physical quantity signals. The memory 401-2 is the medium for temporary storage of information during the operation of the microcontroller 401-1. The task-specific layers of task 1 and task 2 perform computation in a remote apparatus 4011. The electronic apparatus 401 may communicate with the remote apparatus 4011 through any form of network communication for information transmission.

In this embodiment, the electronic apparatus 401 may enable the shared layer and the task-specific layer of task 0 to be in a normally-on state. The electronic apparatus 401 may determine whether to activate the task-specific layers of task 1 and task 2 in the remote apparatus 4011 according to the power supply state.

In FIG. 4B, an electronic apparatus 402 includes microcontrollers 402-1 and 402-2, a processor 402-3, and a sensor 402-4. Each of the microcontrollers 402-1 and 402-2 and the processor 402-3 has a corresponding memory. The microcontroller 402-1 is configured to compute the shared layer as well as the task-specific layer for executing task 0. The microcontroller 402-2 and the processor 402-3 are respectively configured to compute the task-specific layer for executing task 1 and the task-specific layer for executing task 2.

Similarly, the electronic apparatus 402 may determine whether to activate any one of the microcontrollers 402-1 and 402-2 and the processor 402-3 according to the power supply state. Herein, the microcontroller 402-1 may be set to the normally-on state and constantly computes the shared layer and the task-specific layer for executing task 0. The microcontroller 402-2 and the processor 402-3 may determine whether to be activated according to the power supply state of the electronic apparatus 402. When the power supply of the electronic apparatus 402 is sufficient, the microcontrollers 402-1 and 402-2 and the processor 402-3 may all be activated. In contrast, when the power supply of the electronic apparatus 402 is insufficient, the microcontroller 402-2 and the processor 402-3 may be activated alternatively or neither may be activated.

In FIG. 4C, an electronic apparatus 403 may be a system on chip (SOC). The electronic apparatus 403 includes microcontrollers 403-1 to 403-3, a memory 403-4, and a sensor 403-5. The microcontroller 403-1 is configured to execute the shared layer and the task-specific layer of task 0, and the microcontrollers 403-2 and 403-3 are respectively configured to execute the task-specific layers of task 1 and task 2. Similarly, each of the microcontrollers 403-1 to 403-3 may be activated or deactivated according to the power supply state of the electronic apparatus 403 to improve the power usage efficiency.

In the examples shown in FIG. 4A to FIG. 4C, different tasks may be performed through the same or different microcontrollers and processors, depending on the computing power requirement and power consumption requirement. For instance, in FIG. 4A, task 0 has a light power consumption requirement, and task 1 may have medium to light power consumption. The microcontroller 401-1 may first execute task 0 to perform a first-level triggering action. After the first-level triggering action, the microcontroller 401-1 executes task 1 to perform a second-level determination action. In this way, with a single microcontroller 401-1, first computing power may be applied to execute task 0 at first power consumption, and second computing power may be applied to execute task 1 at second power consumption. The first computing power may be less than the second computing power, and the first power consumption is lower than the second power consumption.

Alternatively, in FIG. 4B and FIG. 4C, different microcontrollers and processors are applied to execute different tasks. Herein, task 0 has the minimum computing power requirements and the minimum power consumption requirement. Task 1 has the next minimum computing power requirement and the next minimum power consumption requirement. Task 2 has the maximum computing power requirement and the maximum power consumption requirement. For instance, in terms of determination of human voice, task 0 may be configured to determine whether a human voice is present, and task 1 may be configured to determine voice commands and perform actions. In terms of image processing, task 0 may be configured to detect whether human face detection is performed, and task 1 may be configured to determine emotions and/or ages.

Certainly, the content of the tasks mentioned above is merely examples for description and is not intended to limit the scope of the disclosure.

Figure 5A:
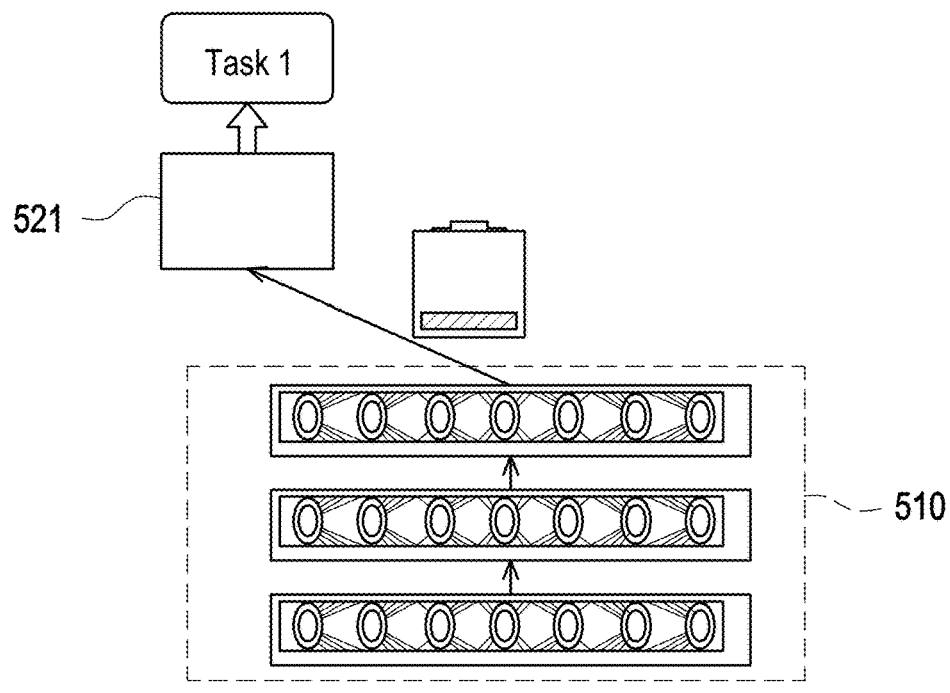
FIG. 5A and FIG. 5B are schematic diagrams of activation mechanisms of task-specific layers according to an embodiment of the disclosure.
Figure 5B:
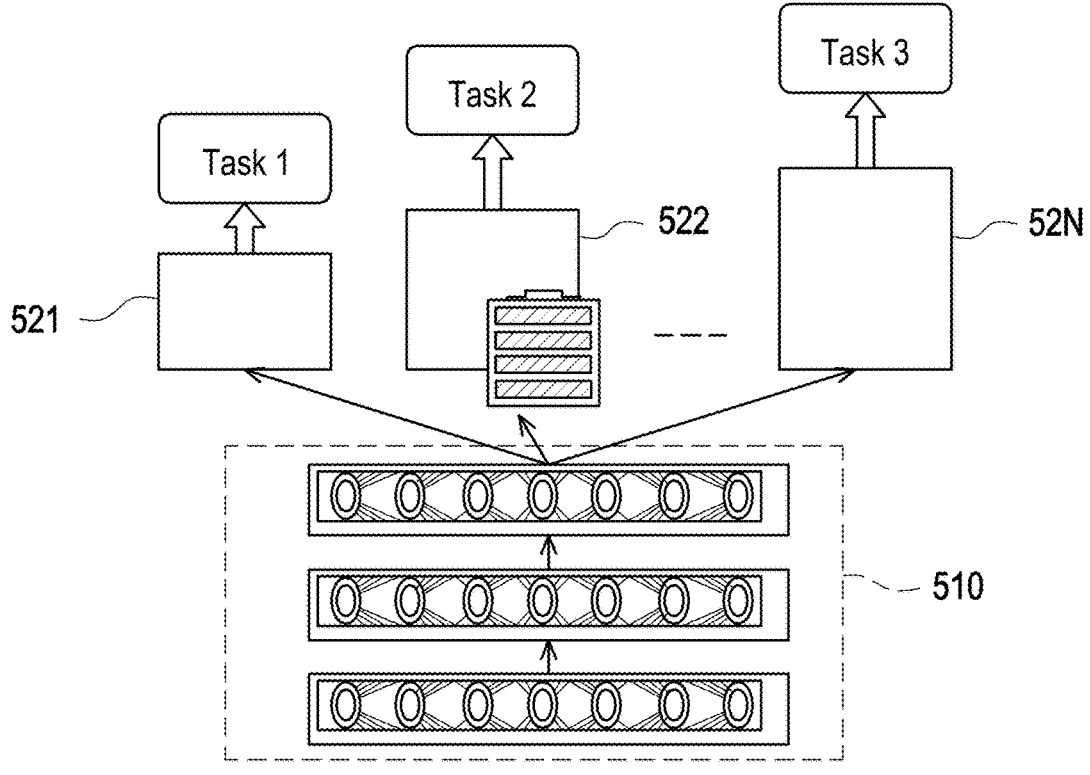

With reference to FIG. 5A and FIG. 5B, FIG. 5A and FIG. 5B are schematic diagrams of activation mechanisms of task-specific layers according to an embodiment of the disclosure. In FIG. 5A, a task-specific layer 521 corresponds to a high priority. Further, when the power supply state of the electronic apparatus is a low power state, the electronic apparatus may only maintain the computing operations of a shared layer 510 and the task-specific layer 521 and executes only task 1.

In FIG. 5B, when the power supply state of the electronic apparatus is a high power state, the shared layer 510 and the task-specific layers 521 to 52N may all be activated. In this way, task 1 to task N may run normally.

Incidentally, in this embodiment, when the power of the electronic apparatus drops, some task-specific layers corresponding to relatively low priority may stop computing to save power.

Figure 6:
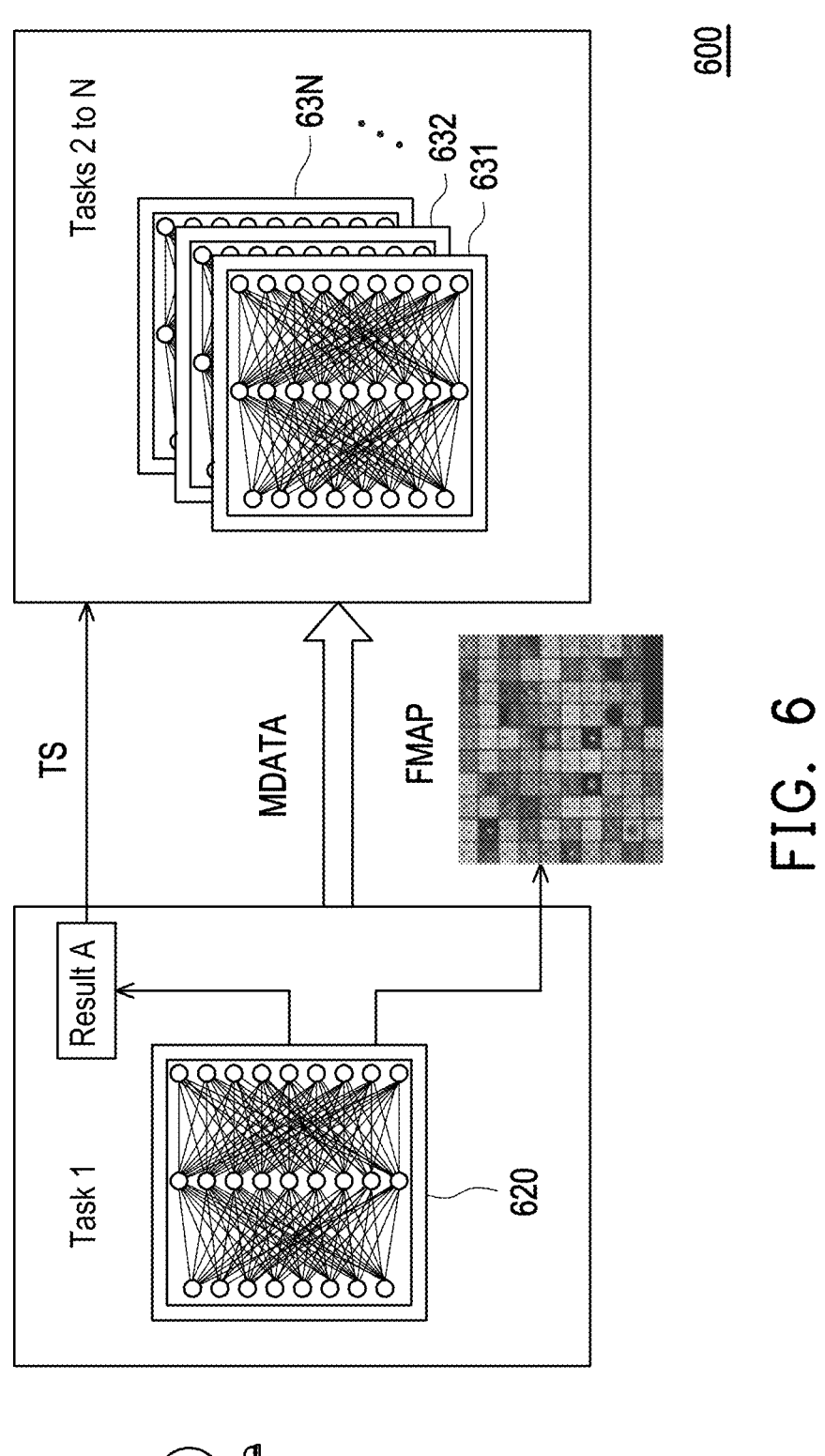
FIG. 6 is a schematic diagram of implementation of an electronic apparatus applying the multi-task deep learning network according to an embodiment of the disclosure.

With reference to FIG. 6, FIG. 6 is a schematic diagram of implementation of an electronic apparatus applying the multi-task deep learning network according to an embodiment of the disclosure. An electronic apparatus 600 includes an image detector 610, a task-specific layer 620, and task-specific layers 631 to 63N. The electronic apparatus 600 may be a door security system, and the image detector 610 is used to receive image information of visitors. The task-specific layer 620 may be set to the normally-on state to execute task 1 to identify whether the visitor is a specific person. The task-specific layer 620 may work under the condition of low power consumption and detect the visiting visitors for a long time.

After task 1 recognizes that the visitor is a specific person, the specific task layer 620 may generate a triggering signal TS, and the triggering signal TS may activate the task-specific layers 631 to 63N. Through the task-specific layers 631 to 63N, task 2 to task N may be executed respectively to further identify the detailed features (e.g., appearance features, gender, mood, job title, door security authority, and other information of the visitor) of the visitor.

Incidentally, the task-specific layer 620 may be used to generate a feature map FMAP. The task-specific layer 620 in task 1 may transmit metadata MDATA to the task-specific layers 631 to 63N in task 2 to task N.

Note that whether the task-specific layers 631 to 63N are activated or not may also be determined according to the power supply state of the electronic apparatus 600. When the electronic apparatus 600 is in a low power state, the electronic apparatus 600 may only maintain the computation operation of the task-specific layer 620 and thus may at least maintain the security of the door security system. When the electronic apparatus 600 is in a normal power state, the task-specific layers 620 and 631 to 63N may be activated, and the complete task 1 to task N may be effectively executed.

In view of the foregoing, in the embodiments of the disclosure, the multi-task deep learning network has the shared layer and the groups of task-specific layers corresponding to different tasks. Through the design of the shared layer, the computation amount and hardware resource requirement of the multi-task deep learning network may be effectively reduced. In addition, in the multi-task deep learning network, the groups of task-specific layers may be activated in stages corresponding to the different power supply states of the electronic apparatus. In this way, in a low power supply state, through the multi-task deep learning network, the electronic apparatus may still maintain the effective operation of the system by performing the high-priority necessary tasks. When power supply is restored to normal, the electronic apparatus may operate normally with full functions.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A generation method of a multi-task deep learning network, comprising:

building at least one shared layer, wherein the at least one shared layer is configured to receive a plurality of pieces of input information and generate a plurality of pieces of processed feature information;

building a plurality of groups of task-specific layers, wherein the groups of task-specific layers compute and generate a plurality of groups of output information corresponding to a plurality of different tasks according to the pieces of processed feature information; and activating at least one of the groups of task-specific layers in stages according to a power supply state of an electronic apparatus and a power consumption requirement of each of the task-specific layers, wherein the step of building the groups of task-specific layers further comprises:

creating a plurality of pieces of power consumption information corresponding to a plurality of arithmetic units;

selecting plural ones among the arithmetic units to build a selected model based on minimum total power consumption according to a corresponding accuracy requirement and the pieces of power consumption information for each one among the groups of task-specific layers;

performing a network weight sparsity analysis and a utilization evaluation to optimize network pruning to generate a hardware-aware model according to the selected model; and generating each one of the groups of task-specific layers according to the hardware-aware model.

2. The generation method according to claim 1, wherein a plurality of requirement conditions are required for generating the groups of task-specific layers, each of the requirement conditions comprises at least one of a power consumption requirement, a computing power requirement, and a hardware resource requirement, and the requirement conditions corresponds to a plurality of priorities.

3. The generation method according to claim 2, wherein the one among the plurality of groups of task-specific layers corresponding to a highest priority has at least one of a minimum power consumption requirement, a minimum computing power requirement, and a minimum hardware requirement.

4. The generation method according to claim 2, wherein the step of activating at least one of the groups of task-specific layers in stages according to the power supply state of the electronic apparatus and the power consumption requirement of each of the task-specific layers further comprises:

turning on at least one of the groups of task-specific layers according to the priorities and the requirement conditions based on the power supply state of the electronic apparatus.

5. The generation method according to claim 1, wherein the step before performing the network weight sparsity analysis and the utilization evaluation to optimize network pruning to generate the hardware-aware model according to the selected model further comprises:

performing a computational optimization analysis for the selected model through a compiler.

6. The generation method according to claim 1, wherein the step of selecting plural ones among the arithmetic units to build the selected model based on the minimum total power consumption according to the corresponding accuracy requirement and the pieces of power consumption information further comprises:

selecting a plurality of selected arithmetic units with highest computing power among the arithmetic units to establish an initial model;

cropping the initial model based on the corresponding accuracy requirement; and obtaining the selected model according to the minimum total power consumption.

7. A multi-task deep learning network, suitable for an electronic apparatus, comprising:

at least one shared layer, wherein the at least one shared layer is configured to receive a plurality of pieces of input information and generate a plurality of pieces of processed feature information; and a plurality of groups of task-specific layers, wherein the groups of task-specific layers compute and generate a plurality of groups of output information corresponding to a plurality of different tasks according to the pieces of processed feature information, wherein each one of the groups of task-specific layers is activated in stages according to a power supply state of the electronic apparatus and a power consumption requirement of each of the task-specific layers, wherein the groups of task-specific layers are generated by a processor with computing power, and the processor is configured to:

creating a plurality of pieces of power consumption information corresponding to a plurality of arithmetic units;

selecting plural ones among the arithmetic units to build a selected model based on minimum total power consumption according to a corresponding accuracy requirement and the pieces of power consumption information for each one among the groups of task-specific layers;

performing a network weight sparsity analysis and a utilization evaluation to optimize network pruning to generate a hardware-aware model according to the selected model; and generating each one of the groups of task-specific layers according to the hardware-aware model.

8. The multi-task deep learning network according to claim 7, wherein a plurality of requirement conditions are required for generating the groups of task-specific layers, each of the requirement conditions comprises at least one of a power consumption requirement, a computing power requirement, and a hardware requirement, and the requirement conditions corresponds to a plurality of priorities, and the one among the plurality of groups of task-specific layers corresponding to a highest priority has at least one of a minimum power consumption requirement, a minimum computing power requirement, and a minimum hardware requirement.

9. The multi-task deep learning network according to claim 8, wherein the electronic apparatus turns on at least one of the groups of task-specific layers according to the priorities and the requirement conditions based on the power supply state.

* * * * *